Figure 1:
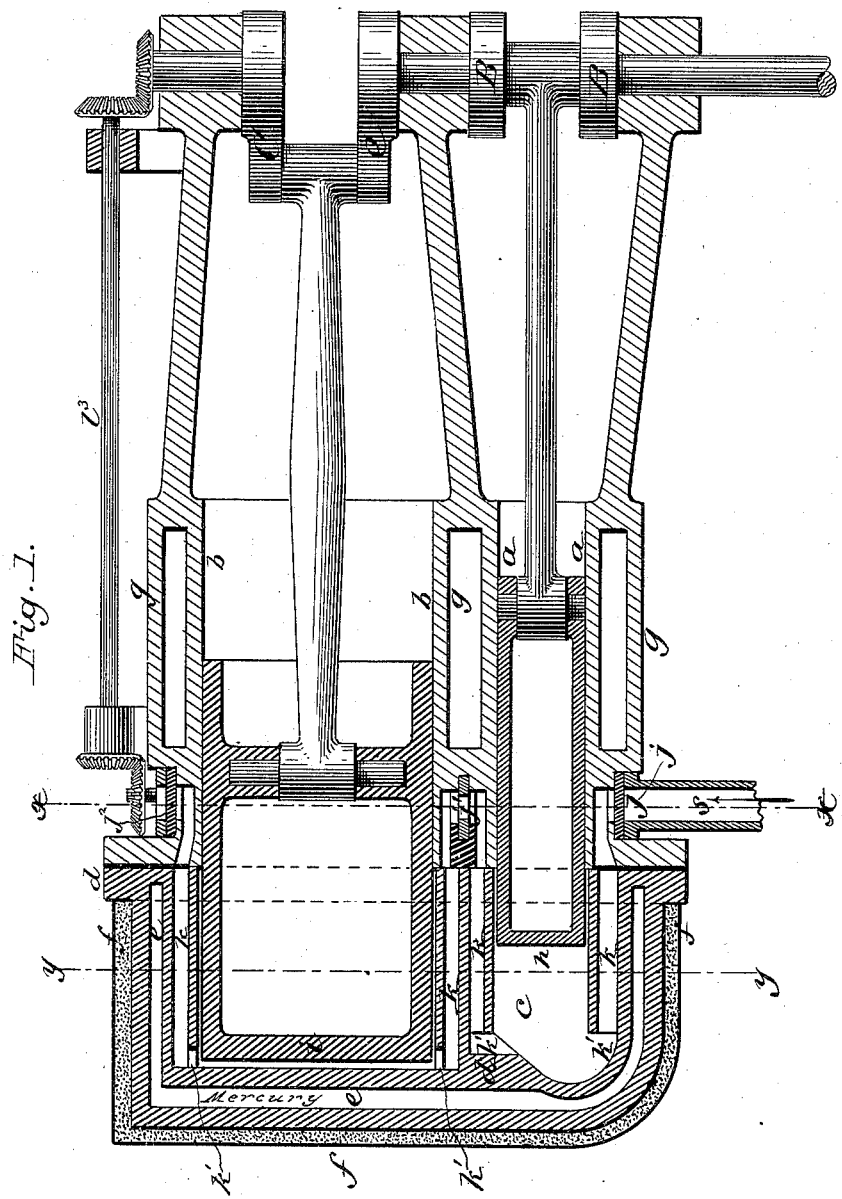

(No Model.) 3 Sheets—Sheet 1.

L. H. NASH.
GAS ENGINE.

No. 341,934. Patented May 18, 1886.

Attest:
Bessie P. Johnson.
R. E. Grant

Inventor:
Lewis Hallock Nash
by Johnson and Johnson
Attorneys.

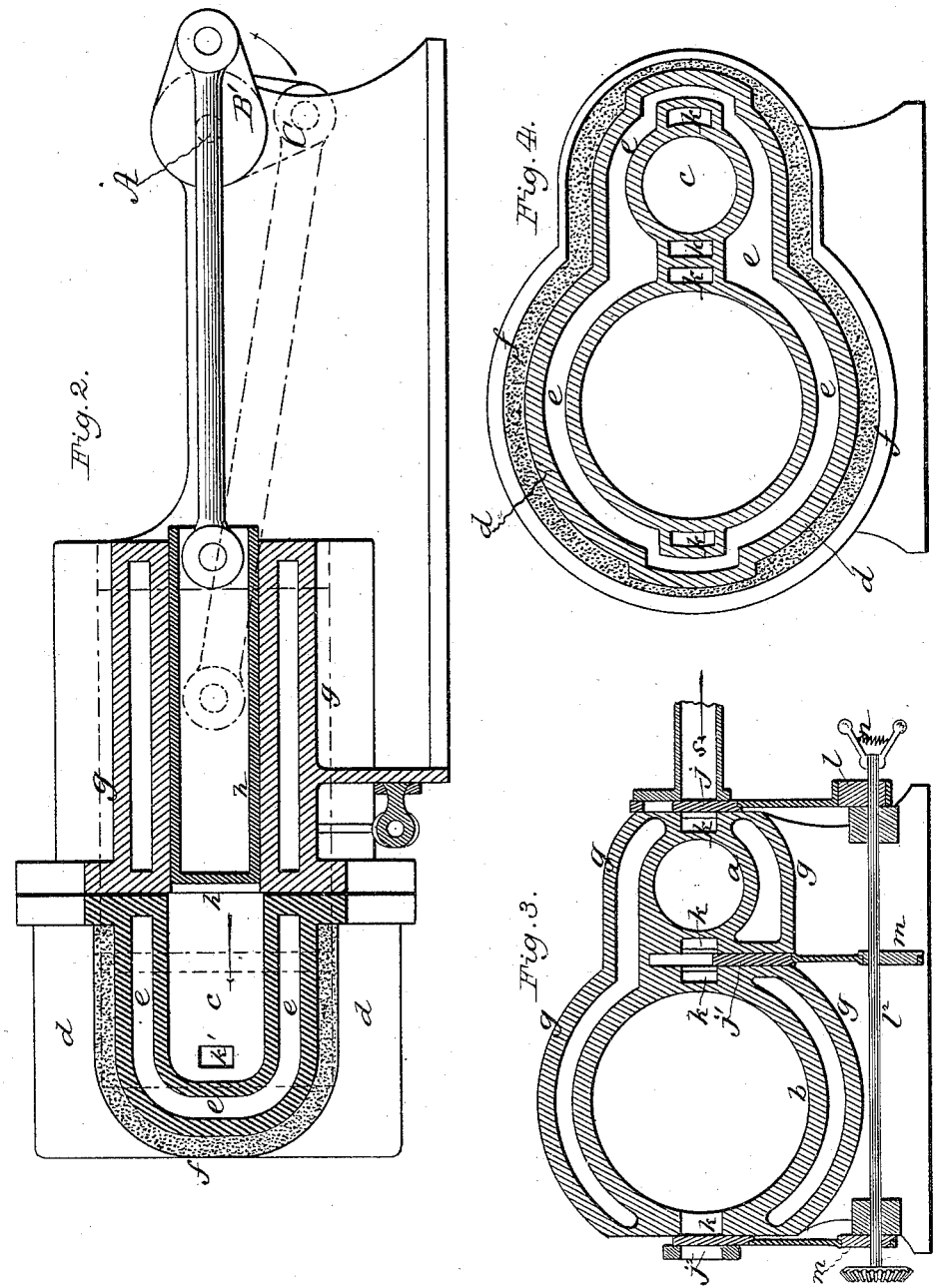

(No Model.) 3 Sheets—Sheet 3.
L. H. NASH.
GAS ENGINE.
No. 341,934. Patented May 18, 1886.
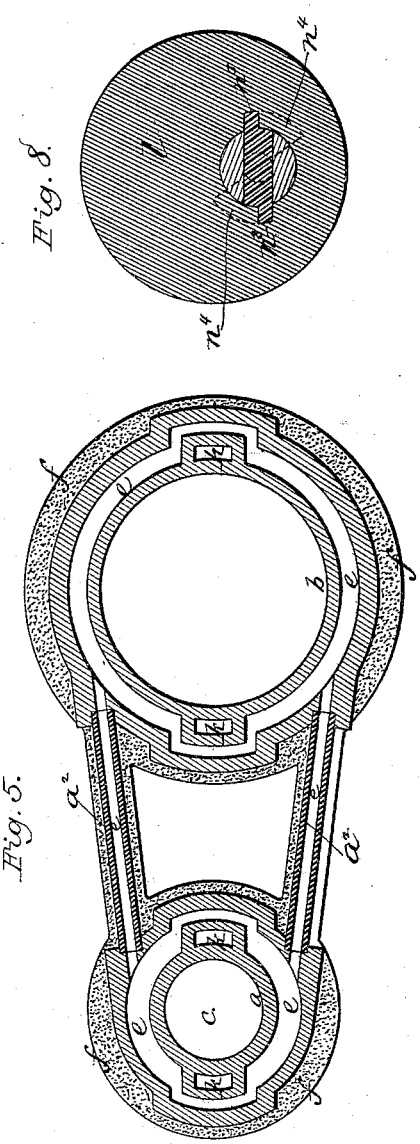
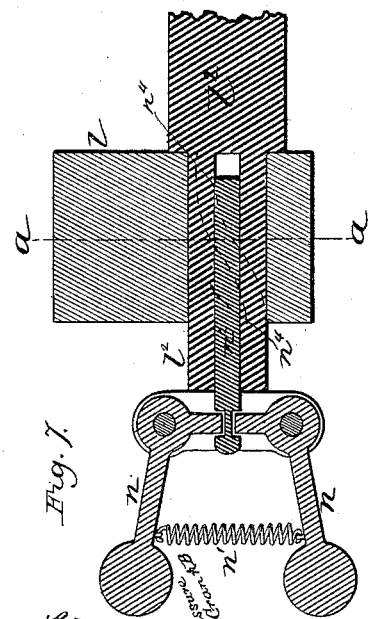
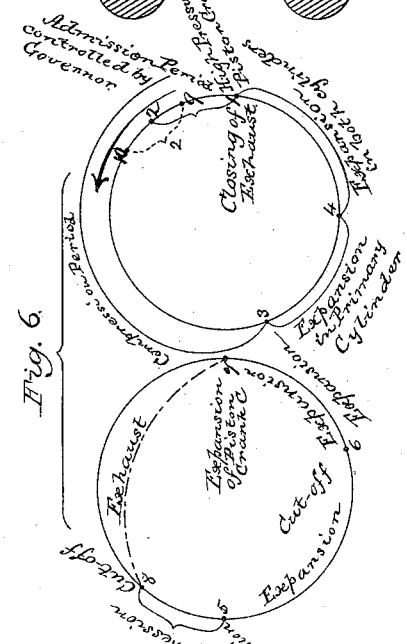
Attest:
Bessie P. Johnson
R. E. Grant
Inventor:
Lewis Hallock Nash
by Johnson and Johnson
Attorneys.

UNITED STATES PATENT OFFICE.

LEWIS HALLOCK NASH, OF BROOKLYN, ASSIGNOR TO THE NATIONAL METER COMPANY, OF NEW YORK, N. Y.

GAS-ENGINE.

SPECIFICATION forming part of Letters Patent No. 341,934, dated May 18, 1886.

Application filed September 23, 1885. Serial No. 177,943. (No model.)

*To all whom it may concern:*

Be it known that I, LEWIS HALLOCK NASH, a citizen of the United States, residing at Brooklyn, in the county of Kings and State of New York, have invented new and useful Improvements in Gas-Engines, of which the following is a specification.

The objects of my improvements are to produce a double-cylinder gas-engine in which the charge is ignited and partially expanded in a primary power-cylinder, and then transferred to a coacting cylinder of greater capacity, wherein the expansion of the charge is completed, to continue the force of such expansion as a secondary power, to utilize the waste heat of the primary cylinder to heat the cylinder of secondary power, and to prevent the loss of the heat from the hot gases. The exploding of the charge in a comparatively small cylinder and expanding it in a larger cylinder causes the intensely-high pressure of the gases at ignition to act upon a comparatively small piston, and therefore the piston-connecting mechanism and the bearings are released from injurious pressure. The power of the gases under such high pressure, instead of being exerted through a very short movement of a large piston, is exerted upon the small piston during a much longer portion of the stroke, whereby the force exerted by the engine is much more uniform, instead of being subjected to a series of short and intense impulses, as in gas-engines. It is these sudden and intense impulses that are so destructive to the wearing parts of the gas-engine, and which require such engines to be constructed of great weight and strength of connections as compared with the power developed. Another advantage of exploding the charge in a small cylinder and continuing its expansion in a larger cylinder is that the expansion in the larger cylinder absorbs the heat given out in the primary cylinder. The admission and ignition of the charge in connection with its secondary expansion is utilized to govern the engine by controlling the operation of the governor.

The accompanying drawings illustrate my improved gas-engine of two coacting cylinders of unequal size and the several matters of construction which form the subject-matter of my invention, in which—

Figure 1 represents a horizontal longitudinal section taken centrally through the coacting power-cylinders, showing the primary piston on its forward stroke and the secondary piston ready to receive the expanding gases from the primary cylinder; Fig. 2, a vertical longitudinal section taken through the primary power-cylinder, showing the piston at the beginning of its back-stroke, and also showing the secondary piston in position in dotted lines on its forward stroke; Fig. 3, a cross-section taken on the line $x\ x$ of Fig. 1, showing the position of the valves; Fig. 4, a similar section taken on the line $y\ y$ of Fig. 1, showing the heat-conducting jacket of the coacting cylinders; Fig. 5, a similar section showing the heat-conveying passages of the two cylinders when the latter are separated from each other; Fig. 6, a diagram showing the path of the two cranks and the action of the gases in each cylinder; Fig. 7, a longitudinal section of the governor, showing its connection with the eccentric; and Fig. 8, a cross-section of the same on the line $a\ a$ of Fig. 7.

I construct the engine of two cylinders, $a$ and $b$, which I denominate the "primary" and "secondary" power-cylinders. The primary cylinder forms the combustion-chamber $c$, and is of less capacity than the chamber of the secondary cylinder, with which it has valved communication, as hereinafter described.

The cylinders are preferably cast together and form the bearings for the pistons, while the chambers in which the charge operates are preferably cast in the separate cap-piece $d$, which is secured to and forms an extension of the cylinders. This cap or hood has an enveloping-space, $e$, formed within its walls, in which a heat-conveying fluid—such as quicksilver or other substance—is placed and caused to circulate by the heat from the combustion-chamber. This cap or hood is enveloped by a non-conductor, $f$, for retaining the heat. At the joining of the chambered cap with the cylinders there is a thick packing, to prevent the conduction of the heat to the bearing-cylinders. By this heat-conveying medium the combustion-chamber is prevented from becoming unduly heated, as the waste heat is taken up from it and conveyed to the secondary cylinder and utilized to increase the expansive force of the gases therein contained, whereby a large economy of power is obtained. The pistons $h$ and $i$ of the respective chambers operate free of the walls thereof, and therefore are not heated to any extent by the combustion of the charge. The bearing-cylinders are formed with a cooling-jacket, $g$; but by the construction of the separate hood for the hot gases the bearing-cylinders may not need a cooling-jacket. The pistons $h$ and $i$ are preferably of trunk form, and are connected to the crank-shaft, as shown in Figs. 1 and 2. The engine-valves $j\ j'\ j^2$ are arranged upon the cool cylinders, and passages $k$ lead from the valves into and through the walls of the hood or cap, and open at $k'$ into the combustion-chambers back of the pistons, through which the charges are admitted into and discharged from the said chambers. By thus placing the valves in the cool bearing-cylinders, and forming passages leading from them through the hood-extension, I obtain the advantage of valves which are never overheated, and avoid the necessity of cooling the combustion-chamber, which must be done when the valves are formed upon the combustion-chamber.

In engines of large dimensions I prefer to separate the cylinders, and maintain the flow of the heat-conveying medium of the cylinders by connecting-pipes $a^2$, which should be covered by non-conducting material, as shown in Fig. 5. The valves are single admission slide-valves arranged one at the outer side of each cylinder and one between them, and they are all operated by eccentrics $l\ m$ on a counter-shaft, $l^2$, as shown in Fig. 3. The counter-shaft $l^2$ is operated by a counter-shaft, $l^3$, driven by bevel-gearing from the crank-shaft A, as shown in Fig. 1. The governor $n$ is carried by the counter-shaft $l^2$, as seen in Figs. 3 and 7, and is of the type known as the "ball-governor," having its balls controlled by a spring, $n'$. The governor-arms engage with a slide, $n^2$, which engages by edge pins $n^3$ with spiral slots $n^4$, formed in the eccentric $l$ to revolve, and thereby regulate the action of the supply-valve $j$. The middle valve, $j'$, operates to admit the charge from the primary cylinder into the secondary cylinder, while the valve $j^2$ controls the exhaust, and the valves are operated by eccentrics fixed upon the counter-shaft $l^2$.

The operation of the engine is as follows, viz.: The pistons being in the positions shown in Fig. 2, the piston $h$ of the primary cylinder being on its extreme forward stroke, and the supply-valve $j$ just opening, a combustible charge is admitted under a considerable pressure to the combustion-chamber $c$, by the pipe $s$, through said valve, the point of such admission being indicated at 1 in Fig. 6, and such admission terminating at 2. From this point the charge is compressed by the back-stroke of the piston to a very high degree. Just after the piston commences its next forward stroke the charge is ignited at 3, and expanding drives the piston forward. When it has reached the position shown in Fig. 1, and at 4, Fig. 6, the valve $j'$ opens communication with the chamber of the secondary cylinder, admitting the charge to continue its operation upon the larger piston $i$, which at this movement is at the beginning of its forward stroke, as shown in Fig. 1, and at 5 in Fig. 6. The two pistons are now driven forward by the expansion of the charge until they reach the position shown in Fig. 2 in full and dotted lines, at which time the crank B of the primary piston is at 1, Fig. 6, and the crank C of the secondary piston at 6 in said figure. The valve $j'$ now closes communication between the two cylinders, a new charge is admitted to the primary piston, and at the same time the gases continue to act in the secondary cylinder, forcing its piston to the end of its stroke, as indicated at 7 in Fig. 6. The exhaust-valve $j^2$ now opens, discharging the gases until the crank C reaches the point 8, Fig. 6, when valve $j^2$ closes the exhaust, and the remaining backward movement of the piston fills the clearance-spaces with compressed gases, thus completing the circuit of both cranks.

The governor acts as follows, viz.: When the engine is working to its greatest capacity, the governor operates the valve to admit the charge to the primary cylinder at the point 1, Fig. 6, and closes the admission at the point 2, having thus admitted a charge while the piston is on its extreme forward stroke. When less power is required of the engine, the governor operates the valve to open the admission later and close it later, as indicated by the dotted points 9 10 in Fig. 6, the charge thus being admitted after the charge has completed a portion of its back-stroke into a chamber of less capacity, therefore a lesser charge can be admitted proportioned to the cylinder-space. The governor effects the above operation by its action in rotating the eccentric $l'$ through a greater or less arc, and thus cause the supply-valve to open and to close more or less early in the back-stroke of the piston.

I prefer to place the two coacting cranks for the two cylinders in relative positions, as shown in Fig. 2, in which the secondary cylinder receives the pressure of the gases before the primary piston has completed its forward stroke, for by this construction the secondary piston exerts its force upon its crank during the latter part of the stroke of the primary piston, and it accomplishes a large part of its stroke at the time the primary piston has completed its stroke; but I do not limit myself to such relation. I prefer to use quicksilver as the medium of conveying the heat from the combustion around the expansion-chamber.

In another application for a patent filed by me, of even date herewith, for improvements in methods of operating gas-engines, I have described and claimed certain methods of operating a gas-engine by governing the speed and power of a gas-engine; a method of compressing, igniting, and partially expanding the gases of the charge during the forward stroke of the piston, exhausting the expanding gases into a cylinder of greater capacity, and completing the utilization of the expansive force therein; a method of conveying the waste heat from the hotter to the cooler power-cylinder; and as one organized means of carrying out these several methods I have shown the engine herein described; but do not herein claim the methods of operating a gas-engine which I have described, but the engine in its constructions and combinations of coacting heat-transmitting cylinders and coacting power-transmitting pistons, as I have described, not meaning to claim herein, broadly, coacting power-cylinders of unequal capacity. Into the one of least capacity the charge is admitted and ignited, and into the one of greatest capacity the charge is transferred to complete its expansive force.

I claim—

1. The combination, with the power-cylinder of a gas-engine, of a hood-extension therefor having ports or passages within its walls opening into the combustion-chamber behind the piston and valves arranged to communicate with the said hood-wall passages, substantially as described, for the purpose specified.

2. The combination of the two coacting power-cylinders of unequal size and their coacting pistons with a hood-extension, forming communicating combustion and expansion chambers for the gaseous charge, and suitable valves for controlling such communication, the inlet and the exhaust, substantially as described.

3. The combination, in a gas-engine, of two coacting power-cylinders forming the bearings, respectively, of two coacting pistons of unequal size, and the engine-valve arranged upon said bearing-cylinders, with a hood-extension having interior wall passages or ports leading from said valves into the chambers of said cylinders back of said pistons, substantially as described, for the purpose specified.

4. The combination, in a gas-engine having a cylinder-chamber for receiving and exploding the charge and a separate communicating cylinder-chamber for expanding the charge, of a heat-conveying jacket adapted to inclose both chambers, containing a heat-conveying fluid whereby the heat from the combustion-chamber is conveyed to the expansion-chamber to increase the expansive force of the gas therein.

5. The combination, in a gas-engine, of two coacting power-cylinders and their coacting pistons of unequal size with the valves $j\ j'\ j^2$, their operating-eccentrics, the crank-shaft, and the governor, substantially as described, for the purpose specified.

6. The combination, in a gas-engine, of two coacting power-cylinders having a cooling water-jacket, $g$, with a hood-extension forming communicating combustion and expansion chambers for the gaseous charge having enveloping space $e$, containing a heat-conveying fluid whereby to convey the waste heat from the combustion around the expansion-chamber, for the purpose described.

In testimony whereof I have hereunto set my hand in the presence of two subscribing witnesses.

LEWIS HALLOCK NASH.

Witnesses:
A. E. H. JOHNSON,
J. W. HAMILTON JOHNSON.